United States Patent [19]

Simokat et al.

[11] 3,889,066

[45] June 10, 1975

[54] RELAY RANGE EXTENDER FOR TELEPHONE SYSTEMS

[75] Inventors: Frank L. Simokat, Euless; Clifford E. Greene, Fort Worth, both of Tex.

[73] Assignee: Superior Continental Corporation, Hickory, N.C.

[22] Filed: Oct. 12, 1973

[21] Appl. No.: 405,787

[52] U.S. Cl. .............................. 179/16 F; 179/16 F

[51] Int. Cl. ............................................ H04m 1/76

[58] Field of Search ...... 179/16 F, 18 F, 16 C, 16 E

[56] References Cited

UNITED STATES PATENTS

| | | | |
|---|---|---|---|
| 3,393,274 | 7/1968 | Ingraham | 179/16 F |
| 3,508,009 | 4/1970 | Henry et al. | 179/16 F |
| 3,626,101 | 12/1971 | Fitzsimons et al. | 179/16 F |

*Primary Examiner*—William C. Cooper
*Attorney, Agent, or Firm*—Strauch, Nolan, Neale, Nies & Kurz

[57] ABSTRACT

A telephone transmission circuit in which a relay range extender has a balanced two-winding relay and a range-extending resistor, in which the relay windings are respectively connected to and in series with the conductors of a two-conductor telephone transmission line, in which the relay is operative to electrically connect the range-extending resistor in series with current-operated central office line equipment and in parallel with the circuit loop containing the transmission line conductors and a subscriber's telephone.

1 Claim, 1 Drawing Figure

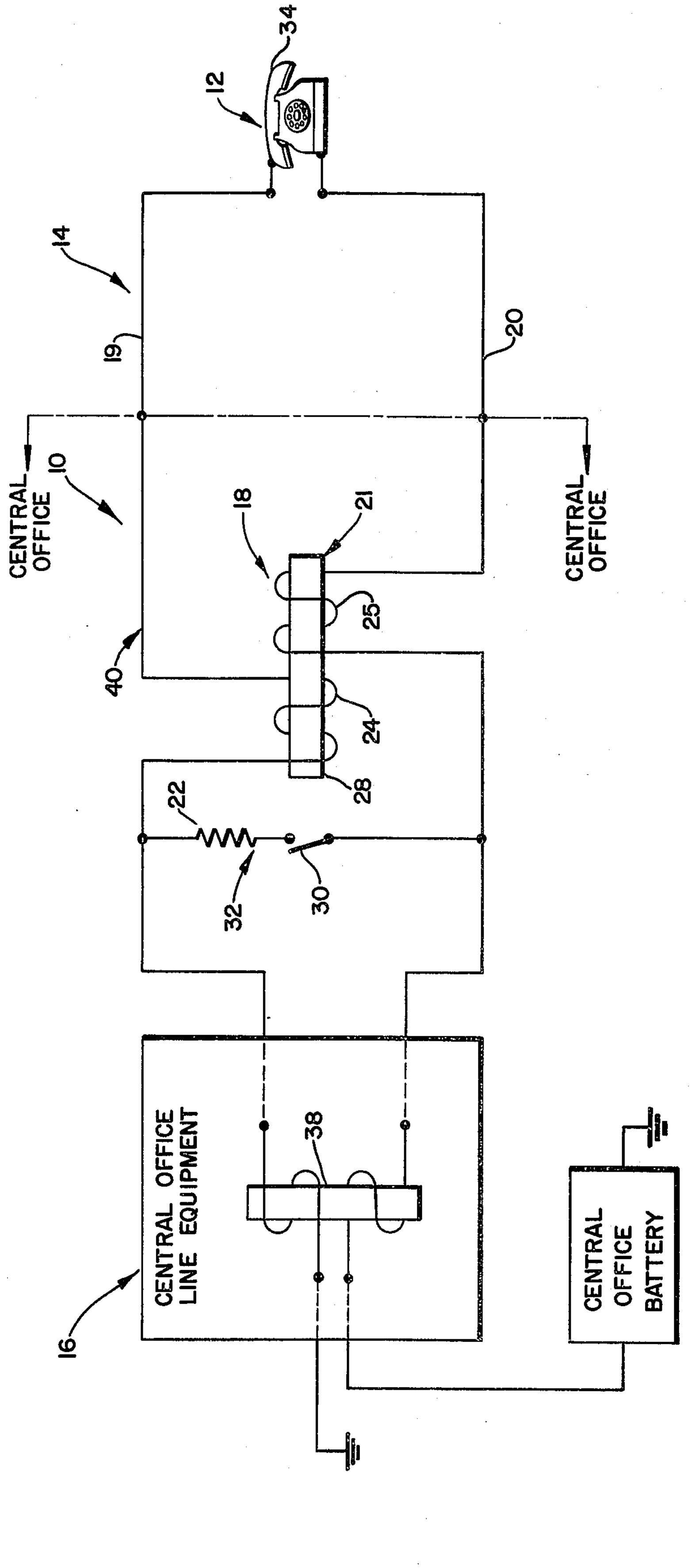
12
34
14
19
20
CENTRAL OFFICE
10
CENTRAL OFFICE
18
21
25
40
24
28
22
32
30
CENTRAL OFFICE LINE EQUIPMENT
38
16
CENTRAL OFFICE BATTERY

RELAY RANGE EXTENDER FOR TELEPHONE SYSTEMS

FIELD OF INVENTION

This invention relates to telephone systems and is particularly concerned with circuits for increasing the effective operating loop resistance range of telephone central office equipment.

BACKGROUND

In telephone transmission circuits a certain amount of loop or line current is needed to satisfactorily operate a subscriber's central office line equipment. Loop current is, in a typical circuit, the current flowing in a subscriber's loop which comprises the conductors of a two-conductor transmission line that connects the subscriber's telephone to the subscriber's central office. In a given telephone circuit, the amount of loop current is limited by the loop resistance of the line. The loop resistance is customarily the d.c. resistance of the transmission line wires or conductors which extend from the central office to a distant point such as the subscriber's telephone.

The normal loop resistance limit of a telephone central office is usually predicated on or determined by the ring trip current which flows in the loop to trip the ring because less current is normally required for satisfactory dialing and for proper operation of the subscriber's telephone instrument.

There are two circumstances in which it is desired to extend the actual loop resistance beyond the normal loop resistance limit. One is where it is necessary or desirable to provide service beyond the normal loop resistance limit. The other is where it is desirable to service equipment with smaller wire gauge (i.e., smaller conductor sizes) in the telephone cable.

The first circumstance mentioned above is frequently brought about by the current trend in which large segments of populations and industry are moving into suburban locations to require longer subscriber lines. The desirability of utilizing smaller conductor sizes in telephone cable has arisen from the increased costs of copper.

To increase the signalling range on subscriber lines which exceed the normal loop resistance limit various techniques have been proposed prior to this invention. With some techniques the increased range is achieved by increasing the voltage of the central office power source or by adding a series-aiding voltage to the loop.

According to a further technique, current for operating the line equipment is increased by a switching circuit which is effective to connect a range-extending resistance across the transmission line or telephone cable wires in parallel with the subscriber's telephone. The resistance "seen" by the central office battery is therefore reduced because the equivalent resistance of the two parallel circuit branches, which respectively contain the range extending resistance and the telephone, will be less than the resistance in each of the two circuit branches. As a result, the current for operating the central office line equipment is increased. The present invention is directed to this last-mentioned technique.

The circuits which switch the range-extending resistance into the telephone circuit are identified by some authorities as range extenders. At least one authority, however, identifies such circuits as loop signalling extenders. For the purpose of this description the switching circuit which connects the range extending resistance into the telephone circuit will be referred to as a range extender.

Various types of range extenders have been proposed prior to this invention. Some of these prior range extenders are objectionable because they degrade the longitudinal balance of the subscriber's transmission line and are highly susceptible to longitudinal a.c. voltages. Other range extenders attempt to achieve longitudinal balance of the line, but at a sacrifice of low manufacturing costs. Prior range extenders typically utilize semiconductor switching devices to achieve the desired switching functions.

SUMMARY AND OBJECTS OF INVENTION

A primary object of this invention is to provide a novel range extender which is simplified and inexpensive to manufacture, but which does not degrade the longitudinal balance of the transmission line.

As compared with prior range extenders which achieve longitudinal balance of the transmission line, the circuit of this invention is less complicated, less costly, and more reliable under certain conditions.

In addition, the circuit of this invention achieves the desired objective of extending the effective operating loop range of the telephone circuit.

These and other objects of this invention are achieved in the illustrated embodiment by providing a balanced two-winding relay in which the relay windings are respectively connected in series with the two conductors of the transmission line or telephone cable to maintain the longitudinal balance of the transmission line. In response to transferring the subscriber's telephone to its off-hook condition this relay operates a switch a range extending resistance into parallel with the subscriber's telephone to thereby increase the current for operating the subscriber's central office line equipment.

Further objects of this invention will appear as the description proceeds in connection with the below-described drawing and the appended claims.

DESCRIPTION OF DRAWING

The drawing is a schematic circuit diagram of a telephone transmission circuit which incorporates a preferred embodiment of this invention.

DETAILED DESCRIPTION

Referring to the drawing, the telephone transmission circuit, which incorporates the principles of this invention, is generally indicated at 10 and comprises a subscriber's telephone 12 of conventional construction, a two-conductor telephone transmission line 14, conventional central office line equipment 16 and a relay range extender 18. The conductors of line 14 are indicated at 19 and 20 respectively. Conductors 19 and 20 are conventionally connected to operating terminals of telephone 12 which is remote from the central office.

According to this invention, extender 18 comprises a balanced two-winding relay 21 and a range-extending resistor 22. Relay 21 may be of any suitable two winding type which has a pair of windings 24 and 25 whose resistances are closely balanced and therefore substantially equal so as not to upset the longitudinal balance of line 14. Preferably, the resistances of windings 24 and 25 are small. Windings 24 and 25 are respectively connected in series with conductors 19 and 20 so that they effectively form a part of the subscriber's loop.

In this embodiment, relay 21 is shown to be a split balanced magnetic reed type which has a magnetizable core 28 and a normally open, magnetically actuatable reed switch contacts 30. Windings 24 and 25 are wound on core 28 in a conventional manner so that upon energizing windings 24 and 25, magnet flux is developed to cause the reed switch contacts to close.

It will be appreciated that the illustration of relay 21 in the drawing is schematic and that the relay core may constitute the contact carrying arm or arms of the reed switch.

As shown, resistor 22 and switch 30 are connected in series to provide a circuit branch which is indicated at 32. In particular, one terminal of resistor 22 is connected to a first terminal of switch 30. The other terminal of resistor 22 is connected to one terminal of winding 24 whose other terminal is connected to conductor 19. The second terminal of switch 30 is connected to winding 25 whose other terminal is connected to conductor 20.

Thus, resistor 22 and switch 30 are connected to the transmission line circuit between windings 24 and 25 and line equipment 16. When switch 30 is closed it connects resistor 30 across conductors 19 and 20 in parallel with telephone 12 or, more particularly, in parallel with the telephone circuit branch which contains the telephone handset 34 and the unshown telephone hookswitch. The telephone handset and the unshown telephone hookswitch are conventionally connected in series across conductors 19 and 20.

Resistor 22, switch 30, and windings 24 and 25 are preferably, but not necessarily, connected in circuit 10 between line 14 and line equipment 16.

Only one line equipment relay, which is indicated at 38, is shown in the central office line equipment for the purpose of illustration. It will be appreciated, however, that a number of different relays in line equipment 16 will be connected to line 14 at different stages in completing incoming and outgoing calls. Thus, relay 38 is merely a representation of one of the various line equipment relays (such as the line relay, the dialing relay and supervision relay) that will be connected at various times to line 14.

Central office battery is shown to be connected to the windings of relay 38 and across conductors 19 and 20 which define the subscriber's loop. The central office battery may be any suitable d.c. power source for feeding current to circuit 10.

Prior to transferring telephone 12 to its off-hook condition, line 14 is usually connected to the line relay in line equipment 16, and the central office battery is connected to the windings of the line relay. When telephone 12 is transferred to its off-hook condition to make an outgoing call the unshown telephone hookswitch closes to complete an energizing circuit for the line relay. The line relay initiates the usual switching operations which eventually switch line 14 to an "A" relay of an unshown linefinder.

Upon transferring telephone 12 to its off-hook condition to make an outgoing call or to receive an incoming call, the current which is drawn through handset 34 and the closed telephone hookswitch energizes relay 21 to cause the contacts of switch 30 to close. As a result, resistor 22 will be connected across conductors 19 and 20 in parallel with the circuit branch which is indicated at 40. Circuit branch 40 includes, in series, winding 24, conductor 19, the unshown telephone hookswitch, handset 34, conductor 20 and winding 25. The line equipment componentry such as the line relay, the dialing relay and the supervision relay will be connected at various times in series with circuit branches 32 and 40.

From the foregoing it will be appreciated that when switch 30 is closed the total resistance across the central office battery will mainly be the resistance of the line equipment componentry which is connected to line 14 plus the equivalent resistance of circuit branches 32 and 40. Since the equivalent resistance of circuit branches 32 and 40 is less than the resistance in circuit branch 32 and less than the resistance in circuit branch 40, the current for operating the line equipment componentry is increased over a circuit which does not have a resistance in parallel with circuit branch 40.

Thus, extender 18 is effective to increase the current for operating central office line equipment relay components to increase the supervision and pulsing range of the central office line equipment and to achieve more reliable operation of the such line equipment components as the dialing, supervision, and cutoff relays. The cutoff relay, as is well known, trips the ring and requires a certain amount of ring trip current to operate. In addition to improving dialing performance the extender of this invention is effective to provide increased current for tripping the ring when the subscriber transfers telephone 12 to its off-hook condition to answer a call. The range extender of this invention therefore provides the line treatment which is needed to provide enough ring trip current and to effect reliable operation of the line equipment components (such as the dialing and supervision relays) for subscriber line circuits in which the actual loop resistance exceeds the normal loop resistance limit.

When telephone 12 is transferred back to its on-hook condition, its unshown hookswitch opens to open the energizing circuit for relay 21. As a result, relay 21 deenergizes to open switch 30 in response to the transfer of telephone 12 to its on-hook condition. Switch 30 will remain open when telephone 12 is in its on-hook condition. When switch 30 is open, resistor 22 is electrically disconnected from circuit 10 and is therefore not electrically connected across conductors 19 and 20.

It will be appreciated that by electrically connecting resistor 22 across conductors 19 and 20 and in parallel with circuit branch 40, the amount of current flowing through circuit branch 40 for operating telephone 12 is reduced as compared with the line current that is available in subscriber line circuits which are not equipped to connect a resistance in parallel with circuit branch 40. However, there is normally more than enough current available for achieving proper operation of telephone 12 in telephone circuits which do not have a range extender. Therefore, the smaller amount in loop or line current which is available for operating telephone 12 in the circuit of this invention will not adversely affect operation of the telephone if the resistance of resistor 22 is not too small.

Thus, the size of resistor 22 has a lower limit. On the other hand, the resistance of resistor 22 must be small enough to provide enough current for proper operation of the line equipment. Preferably, the size of resistor 22 is so selected that it reduces the amount of current in branch 40 only just enough to provide sufficient current for achieving operation of the line equipment.

As one example, the resistance of resistor 22 may be 3K ohms for a telephone circuit in which the resistance of each of the windings 24 and 25 is about 20 ohms, in which the resistance of each of the conductors 19 and 20 is about 600 to 900 ohms, and in which the central office battery voltage is about 50 volts. By utilizing modern relay technology and by proper selection of the size of resistor 22, it is possible to increase the d.c. office loop limit by approximately 50 percent.

By making windings 24 and 25 of substantially equal resistance and by connecting them respectively in series with conductors 19 and 20, the longitudinal balance of line 14 is not degraded. It also will be appreciated that the extender of this invention is simplified, can easily and readily be installed in a telephone transmission system, has relatively few components, and is relatively inexpensive. Furthermore, relays which are suitable for incorporation into the extender of this invention are highly reliable in operation and are not subject to failure or malfunction by lighting as are semiconductor devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a telephone transmission circuit, a telephone having a hookswitch, central office line equipment for said telephone, a two-conductor telephone transmission line having first and second conductors, and a relay range extender for increasing the amount of operating current fed to said line equipment without electrically disconnecting said telephone from the central office in which said line equipment is located, said relay range extender comprising a balanced two-winding relay and resistor means, said relay having a set of normally open contacts and a pair of windings which have substantially equal resistances and which are respectively connected to and in series with said first and second conductors, said telephone being electrically connected by said line and said windings to said line equipment, said windings, said conductors and said hookswitch being connected in a loop circuit to provide for current flow serially through one of said windings, said first conductor, said hookswitch, said second conductor and the other of said windings, said resistor means and said set of normally open contacts being connected in series in a circuit branch which is in parallel with said loop circuit, said hookswitch being effective upon closure to complete a circuit through said loop circuit for energizing said windings and for maintaining said windings energized as long as said hookswitch is closed, and said set of contacts being closed by energization of said windings to complete a circuit which electrically connects said resistor means in parallel with said loop circuit and in series with at least one relay in said line equipment as long as said hookswitch is closed, said resistor means having a pre-selected resistance which when connected in parallel with said loop circuit branch by closure of said set of contacts increases the operating current for said line equipment relay over the value that it would have if said resistor means were not connected in parallel with said loop circuit without reducing the telephone operating current fed through said loop circuit below the amount needed for operation of said telephone.

Referring to the drawing, the telephone transmission circuit, which incorporates the principles of this invention, is generally indicated at 10 and comprises a subscriber's telephone 12 of conventional construction, a two-conductor telephone transmission line 14, conventional central office line equipment 16 and a relay range extender 18. The conductors of line 14 are indicated at 19 and 20 respectively. Conductors 19 and 20 are conventionally connected to operating terminals of telephone 12 which is remote from the central office.

* * * * *

UNITED STATES PATENT OFFICE

CERTIFICATE OF CORRECTION

PATENT NO. : 3,889,066

DATED : June 10, 1975

INVENTOR(S) : Frank L. Simokat and Clifford E. Greene

It is certified that error appears in the above-identified patent and that said Letters Patent are hereby corrected as shown below:

Column 2, line 34, change "a" to -- to --.

Column 6, delete last paragraph.

Signed and Sealed this

*ninth* Day of *September 1975*

[SEAL]

*Attest:*

RUTH C. MASON
*Attesting Officer*

C. MARSHALL DANN
*Commissioner of Patents and Trademarks*